US007102487B2

(12) United States Patent
Mafune et al.

(10) Patent No.: US 7,102,487 B2
(45) Date of Patent: Sep. 5, 2006

(54) DETECTOR AND LOCK CONTROLLER USING SAME

(75) Inventors: Shoji Mafune, Nagoya (JP); Kazuhiro Negoro, Kasugai (JP); Yasuhiro Satoh, Ootsu (JP); Tadao Nishiguchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 148 days.

(21) Appl. No.: 10/759,760

(22) Filed: Jan. 16, 2004

(65) Prior Publication Data

US 2004/0257267 A1 Dec. 23, 2004

(30) Foreign Application Priority Data

Jan. 20, 2003 (JP) .............................. 2003-010821

(51) Int. Cl.
*H04Q 9/00* (2006.01)
*B60R 25/10* (2006.01)
*G08B 13/18* (2006.01)
*G01S 13/58* (2006.01)
*E05B 65/12* (2006.01)

(52) U.S. Cl. ................. 340/5.7; 340/5.61; 340/5.2; 340/426.1; 340/552; 342/107; 70/256

(58) Field of Classification Search ............... 342/107; 70/256; 340/5.7, 5.61, 5.2, 426, 552
See application file for complete search history.

(56) References Cited

U.S. PATENT DOCUMENTS

| 4,107,684 A * | 8/1978 | Watson, Jr. ............... 342/86 |
| 5,606,737 A * | 2/1997 | Suzuki et al. ............. 455/319 |
| 5,973,611 A * | 10/1999 | Kulha et al. .............. 340/5.62 |
| 6,522,241 B1 * | 2/2003 | Baudard .................. 340/5.61 |
| 6,552,649 B1 * | 4/2003 | Okada et al. ............. 340/5.61 |
| 6,700,475 B1 * | 3/2004 | Geber et al. ............. 340/5.61 |
| 6,879,247 B1 * | 4/2005 | Shimomura et al. ... 340/426.18 |
| 6,946,949 B1 * | 9/2005 | Heide et al. ............. 340/5.61 |

OTHER PUBLICATIONS

Patent Abstracts Of Japan, publication No. 09/088396, *Vehicle Safety Device Allowing Only Authorized Person To Open Door*, Labonde Damien, filed Mar. 29, 1996.

* cited by examiner

*Primary Examiner*—Jeffery Hofsass
*Assistant Examiner*—Scott Au
(74) *Attorney, Agent, or Firm*—Beyer Weaver & Thomas LLP (57) ABSTRACT

A lock controller has main apparatus provided to a lockable door and a detector for detecting an approaching or retreating target object. The detector includes an oscillator device for generating a transmission wave, a branching device for branching the transmission wave, a transmission device for transmitting the transmission wave into space as electromagnetic waves, a reception device for receiving the transmission wave reflected by the target object, a mixer for mixing a reception signal received by the reception device and a branched signal branched by the branching device to output a mixed signal, and a judging device for switching on a detection output indicating the target object approaching and retreating based on an increase and a decrease of the mixed signal outputted from the mixer. A detection distance is set within ¼ wavelength of frequency effective for the detection. The main apparatus sends by wireless transmission a specified request signal to a portable device carried by the user, and if an answer signal is received from the portable device in response, causes the lockable part to be unlocked after ascertaining that the received answer signal is a correct signal.

7 Claims, 5 Drawing Sheets

DETECTOR AND LOCK CONTROLLER USING SAME

BACKGROUND OF THE INVENTION

This invention relates to a detector for detecting the user's hand as it approaches the door handle of an automobile and generating a trigger signal for initiating the automatic unlocking operation of a passive entry system for the automobile. The invention also relates to lock controllers using such a detector.

In recent years, there have been proposals for vehicle entry system apparatus for automatically operating an equipment on a vehicle by carrying out two-way communications between a device carried by the user and a vehicle-mounted main device and thereby carrying out a required comparison, and some of such apparatus are actually coming to be used. With such an apparatus adapted to carry out two-way communications, an answer signal containing a necessary code can be automatically transmitted from the device carried by the user to the main device in response to a request signal (such as a startup signal for starting up the device being carried) transmitted from the main device and hence an equipment on a vehicle can be caused to carry out a specified operation without the user carrying out any operation at all. With a vehicle entry system, for example, the user carrying a portable device may have only to approach the door of a specified vehicle to which a corresponding main device is mounted for establishing a two-way communication between them such that a lock-opening command is automatically outputted to the locked door and the locked door becomes automatically unlocked. Such highly convenient entry systems capable of locking and unlocking a vehicle door basically without requiring any conscious effort on the part of the user are sometimes referred to as a passive entry system (or a smart entry system) as an improved version of general keyless entry systems, and needs for such systems are becoming higher as they are capable of increasing the market values of the vehicles.

If it is attempted with such a passive entry system to save the power of the vehicle battery by transmitting request signals from the main device only when they are necessary, a detector may be required for detecting the user approaching or contacting the vehicle (such as to its door handle).

Optical sensors, capacitance sensors and mechanical switches (so-called micro-switches) have recently been used for such a purpose. Optical sensors are adapted, for example, to detect the user's hand approaching the door handle on the basis of a change in the output from a light-receiving element as light outputted from a light-emitting element is screened or reflected by the user's hand. Capacitance sensors are so-called touch sensors and adapted, as disclosed in Japanese Patent Publication Tokkai 2002-295064, to detect the user's hand approaching the door handle based on a change in the capacitance of a capacitor within the sensor by the contact of the user's hand. Examples of a sensor of a non-contact type include Doppler radars used for a startup switch device for an automatic door, as disclosed in Japanese Patent 2785893.

Prior art technologies characterized as using a detector as explained above have problems as explained below.

(A) Optical sensors may function incorrectly in the presence of unwanted objects such as rain drops and dead leaves or due to the incidence of light from a lamp or sunlight, while capacitance sensors are weak against noise as a matter of principle and tend to function incorrectly in the presence of dielectric matters such as rain drops.

(B) Response characteristics of optical, capacitance and mechanical sensors are not sufficient because their detection areas are small (or their detection distance is short) and the system depending on such a sensor may function incorrectly. If such a sensor is set to the door handle of a vehicle for providing a trigger for the transmission of a request signal in a passive entry system of the vehicle, for example, the user's hand may not be detected and hence the request signal may not be outputted until the hand nearly touches the sensor. Thus, the user may be already starting to pull the handle in order to open the door but the door may not be unlocked yet. In other words, the user may try to open the locked door quickly by using a passive entry system but its automatic unlocking operation may be delayed and the door may refuse to open immediately. In the case of a capacitance sensor or a mechanical switch, in particular, detection is not made until the user's hand makes a firm contact with the sensor. If the detector is of a kind having such a sensor simply attached to the door, the communication to the portable unit is completed and the door is unlocked only after the user begins to pull the handle in order to open it. Thus, this problem does not fail to appear.

(C) Since sensor elements which are relatively large and hence are difficult to be contained must be provided to a vehicle component such as a door handle intended to detect the approaching target object of detection, the shape and the size of such a component may have to be modified significantly to accommodate such sensor elements and hence the freedom in its design is severely restricted. In particular, when it is desired to detect the user's hand approaching the door handle of a vehicle with a response characteristic as high as possible by using an optical sensor or a mechanical switch, a light-emitting element and a light-receiving element must be placed near the door handle or a contact probe of a mechanical switch must be placed at a position protruding from the door handle. Thus, the design of the door handle or the body parts of the vehicle in the vicinity is severely affected, In the case of a capacitance sensor, a relatively bulky electrode must be buried inside the handle and this also limits the freedom in the design.

As explained above, Doppler radars used for automatic doors are known examples of sensors of a non-contact type capable of providing a large detection area and not affected by dirt or the like. Thus, it may be considered to use such a Doppler radar as the detector for a passive entry system, but prior art Doppler radars are for detecting the speed and direction of the motion of a target object of detection on the basis of changes in the frequency of received waves and cannot be used directly for detecting a target object approaching within a short distance by means of a simple structure. The device according to aforementioned Japanese Patent 2785893, for example, is adapted to carry out complicated judging processes with its signal processor comprising a microcomputer, its power consumption rate is high and the signal processor becomes big, requiring a large space for its setting. Thus, it is not feasible to be used as the detector for a vehicle which uses battery cells as its power source and is strongly required to be energy-saving and compact.

It is therefore an object of this invention to make use of the technology of Doppler radars to provide an improved detector superior in operational reliability, response characteristics, and capability of being mounted to a vehicle (from the points of view of size, freedom in design and power consumption).

It is another object of this invention to provide a lock controller using such a detector.

SUMMARY OF THE INVENTION

A detector according to a first embodiment of this invention is for detecting a target object of detection approaching or retreating from the detector and may be characterized as comprising an oscillator device for generating a transmission wave, a branching device for branching the transmission wave generated by the oscillator device, a transmission device for transmitting the transmission wave into space as electromagnetic waves, a reception device for receiving the transmission wave transmitted by the transmission device and reflected by the target object, a mixer for mixing a reception signal received by the reception device and a branched signal branched by the branching device to output a mixed signal, a judging device for switching on a detection output indicating the target object approaching and retreating based on an increase and a decrease of the mixed signal outputted from the mixer, wherein a detection distance is set within ¼ wavelength of frequency effective for the detection.

In the above, the target object may be a person's hand. The oscillator device, the transmission device, the reception device and the mixer are components of a Doppler radar and may be made compact by using prior art components. The judging device may be formed with a compact prior art circuit of a simple structure including a high pass filter and a comparator. The oscillator device is for generating an effective frequency. The wave generated by the oscillator device may be the transmission wave itself or a basic wave to serve as the source of the transmission wave and may be a continuous wave or an impulse wave generated at the positions of the rise or the fall of a rectangular wave. In other words, the transmission wave of the Doppler radar may be a continuous wave, a pulse wave or an impulse wave. The signal to be mixed with the signal received by the mixer may be the wave obtained by modulating the transmission wave.

The detection distance is the length of the detection area in the direction in which the target object approaches and retreats from the antennas. That the detection distance is set within ¼ wavelength of frequency effective for the detection means that the detector (such as its effective frequency) is set such that the detection distance will be within ¼ wavelength of the effective frequency. It is not to be understood as meaning that the detection distance is limited to any particular length.

By setting the effective frequency, transmission output power and the reception sensitivity appropriately, a sufficiently large detection area may be established. If the effective frequency is 1 GHz, its ¼ wavelength is 7.5 cm and this means that a detection distance up to 7.5 cm may be set. This is sufficient for detecting the user's hand approaching the door handle of a vehicle and generating a trigger for the automatic unlocking of the door.

According to this invention, the detection distance is set within ¼ wavelength of frequency effective for the detection. As a result, the phase or the timing of the transmission and reception waves may be appropriately set such that the output from the mixer (herein referred to as the output V) will uniformly change according to the distance L to the target object. For example, it may be set such that V increases as L increases. Thus, a judging device may be able to switch on a detection output indicative of a target object approaching or retreating based on whether or not the output V is increasing or decreasing. With such a judging device, the motion of the target object can be detected in a non-contacting manner. The judging device may be adapted to detect only an approaching object, only a retreating object or both.

The aforementioned oscillator device is preferably one that generates a non-sinusoidal wave with frequency less than ⅕ (more preferably less than ⅒) of frequency effective for the detection. The non-sinusoidal wave may be any wave other than a sine wave such as a rectangular wave for generating a signal including a wave with an effective frequency. Such an oscillator device can be formed with an inexpensive circuit and the antennas comprising the aforementioned transmission and reception devices need not be adjusted to any particular frequency. This is advantageous from the point of view of the freedom in the design of the antennas.

A speed correcting device for changing the detection output based on the speed of change of the output V from the mixer or a speed signal outputting device for outputting a speed signal indicative of the speed of motion of the target object based on the speed of change of the output V from the mixer may be provided additionally. The speed correcting device may be used such that the detection output will be prevented from being switched on if the detected speed of change is too fast and greater than a specified threshold value (or too slow) although the judging device alone would have switched on the detection output. The speed correcting device may be used, instead, to prevent the detection output from being switched on if the detected speed of change is within a specified range. Such a speed correcting device may be formed with a filter for passing only components of the output from the mixer within a specified range placed on the output (downstream) side of the mixer and the input (upstream) side of the judging device.

With such a speed correcting and/or speed signal outputting device, it becomes possible to change the detection output according to the speed of motion of the target object and/or to output information on the speed of motion of the target object such that the reliability in the detection of the target object can be improved and it is convenient because such additional information can be further communicated to another system. When the target object of detection is a person's hand, for example, a recognition error in the case of a different object moving much faster than the normal motion of the hand or stationary objects can be reliably prevented. An alarm can be provided such that a warning may be outputted if the hand motion was too speedy such that the door could not be unlocked before the hand reached the door handle to try to open it.

A lock controller according to this invention is a control unit for a passive entry system with which a vehicle or a building may be equipped, using a detector according to this invention for detecting the user's hand as it approaches the handle of a lockable structure such as a door and using the detection output from this detector as a trigger for an operation including that of unlocking the door.

DETAILED DESCRIPTION OF THE INVENTION

The invention is described next by way of examples with reference to the drawings.

Figure 1A:
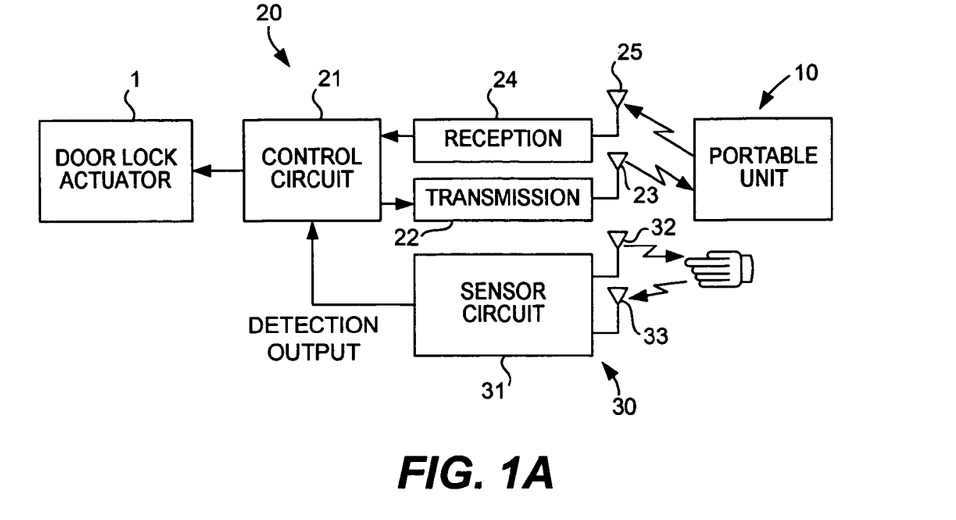
FIGS. 1A and 1B are block diagrams respectively of a lock controller and a detector embodying this invention.

FIG. 1A shows a first embodiment of this invention as applied, for example, to a control device of a passive entry system of a vehicle, comprising a portable unit 10, a main device 20 mounted to the vehicle and a detector 30.

Although not illustrated in FIG. 1A in detail, the portable unit 10 is provided with an antenna and a reception circuit for receiving a low frequency (LF) startup signal of about 100–150 kHz, a transmission circuit and an antenna for the wireless transmission of answer and operation (lock and unlock) signals to be described below on a high-frequency wave (say, within the UHF band), a memory (such as an EEPROM) for storing at least an identification check code (or the "ID code"), a control circuit including a microcomputer for controlling the entire operation of the portable unit 10 and battery cells.

In the above, the startup signal is a signal for starting up the microcomputer of the portable unit 10 in the power-saving WAIT mode (or the SLEEP mode). The microcomputer of the portable unit 10 is programmed so as to transmit an answer signal including the aforementioned ID code on a high-frequency electromagnetic wave. In this sense, the aforementioned startup signal may be said to serve as a request signal according to this invention.

Power which is required for the portable unit 10 (at least at the time of the startup) may be arranged to be supplied from the main device 20. Since the transmission from the main device 20 to the portable unit 10 is by way of a low-frequency wave, power transmission on this wave can be carried out relatively efficiently. In fact, it is possible in principle to supply all of the power required by the portable unit 10 from the main device 20 such that the portable unit 10 may not be required to contain any battery cells.

The portable unit 10 may be provided with lock and unlock switches (not shown) of a push-button type on its surface so as to function as a remote controller (for one-way transmission) of an ordinary keyless entry system. In other words, the portable unit 10 may be adapted to function not only so as to transmit the answer signal for a specified number of times upon being started up by receiving the startup signal but also so as to start up as the lock switch or the unlock switch is operated and to carry out the wireless transmission of a lock signal or an unlock signal inclusive of the ID code. As the lock signal or the unlock signal is received by the main device 20, the ID code is checked and the vehicle door is immediately locked or unlocked.

The portable unit 10 according to this example is adapted to automatically return to the WAIT mode as soon as a requested operation (such as the transmission of the answer signal) is completed and to remain in the WAIT mode until the startup signal is received next such that wasteful consumption of power is avoided. This feature, however, is not intended to limit the scope of this invention. The portable unit 10 may be adapted to normally remain in a standby mode and become intermittently activated into an active mode at specified intervals to activate the reception circuit. If a specified request signal (which may not be the startup signal but may be only for requesting an answer signal and need not be a low-frequency signal but may be a high-frequency signal) is received from the main device 20 while the reception is intermittently activated, the portable unit 10 may respond to it by carrying out for a specified number of times the wireless transmission of an answer signal inclusive of the ID code registered in the memory on the side of the portable unit 10. The portable unit 10 may be in the form of a card separate from the ignition key of the vehicle or may be in the form of a key, integrated with the ignition key.

With reference still to FIG. 1A, the main device 20 comprises a control circuit 21, a transmission circuit 22 with a transmission antenna 23, and a reception circuit 24 with a reception antenna 25. The transmission circuit 22 and the transmission antenna 23 are for the purpose of transmitting the aforementioned low-frequency startup signal, and the reception circuit 24 and the reception antenna 25 are for the purpose of receiving the aforementioned high-frequency answer signal and operation signals. The control circuit 21 includes a microcomputer serving to carry out necessary operations for controlling the main device 20 as a whole as well as a door lock actuator 1 of the vehicle. It also includes a memory device such as an EEPROM for storing the ID code.

The control circuit 21, the transmission circuit 22 and the reception circuit 23 are inside a control unit which may be disposed, for example, inside the door of the vehicle. The transmission and reception antennas 23 and 25 may be provided to the control unit 21 but may also be set at some other place such as on the room mirror, the door mirror or the door handle either together with or apart from the transmission and reception circuits 22 and 24.

The detector 30 is a door handle sensor adapted to detect a body part (such as a hand or a finger) of the user approaching the door handle of the vehicle and to generate a detection output which will serve as a trigger for the automatic unlocking operation on the door. As shown in FIG. 1A, it includes a sensor circuit 31, a transmission antenna 32 ("transmission device") and a reception antenna 33 ("reception device").

Figure 1B:
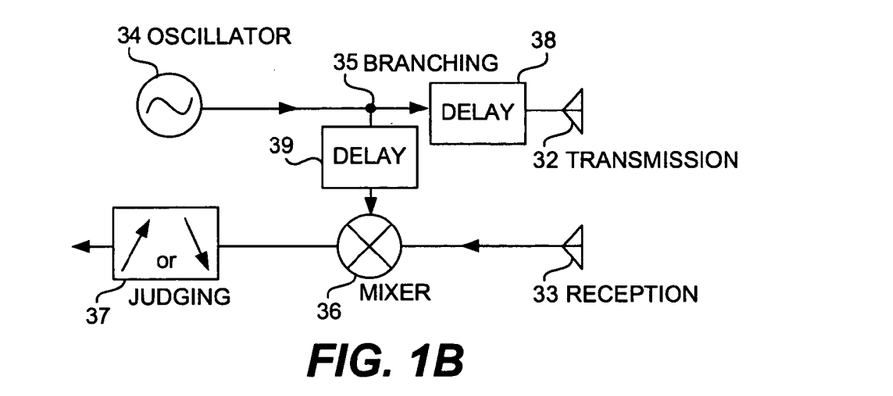

As shown more in detail in FIG. 1B, the sensor circuit 31 includes an oscillator device 34, a branching device 35, a mixer 36, a judging device 37 and delay devices 38 and 39. The sensor circuit 31 may be disposed inside the control unit together with the control circuit 21 or inside the door handle. The transmission and reception antennas 32 and 33, the oscillator device 34, the branching device 35, the mixer 36 and the delay devices 38 and 39, referred to above, are elements similar to those used in a Doppler radar (or portions thereof downstream of the mixer except for the signal processor) and hence will be explained below only briefly.

The oscillator device 34 is for generating a continuous transmission wave (such as a sinusoidal wave) with effective frequency of, say, 500 MHz-1 GHz and may comprise an oscillator circuit of a known kind formed with a quartz oscillator element, a capacitor and a resistor or a high-level oscillator circuit such as a PLL oscillator circuit. The branching device 35 is for branching the transmission wave generated by the oscillator device 34. A distributor of a known kind such as a Wilkinson distributor and a distributor using a resistor may be used for the purpose. The outputs of this branching device 35 are inputted to the two delay devices 38 and 39.

The delay devices 38 and 39 may each be a circuit designed for a delay but also may be a device of any kind that happens to function as a delay device, making use of the delay due to a circuit or a component. They may be of a simple structure with the magnitude of the delay determined merely by the length of a transmission line. The output from one of the delay devices (38) is inputted to the transmission antenna 32 and that from the other (39) is inputted to the mixer 36.

The transmission antenna 32 is for transmitting into space as electromagnetic waves the transmission wave received from the delay device 38, and the reception antenna 33 is for receiving the electromagnetic waves transmitted from the transmission antenna 32 and reflected by an object of detection such as a person's hand. Antennas of known kinds may be used for their purposes and may be attached to the door handle or on the door somewhere near the door handle.

The mixer 36 is for mixing together the signal received by the reception antenna 33 and the signal branched by the branching device 35 and passed through the delay device 39 and taking out the signal component due to the presence of a target object by carrying out a logical multiplication of these two signals (from the transmission and reception waves). Such a mixer may be of a known kind comprising a single diode.

Figure 2A:
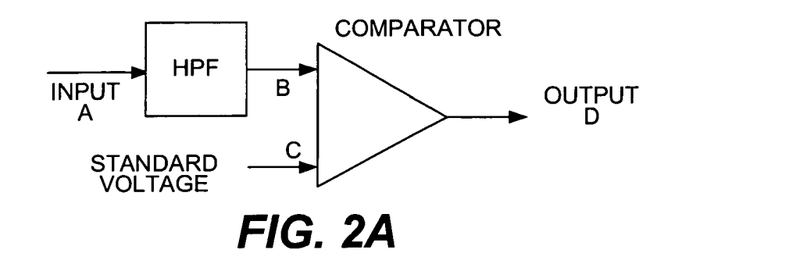
FIG. 2A is a block diagram of the judging device and FIGS. 2B and 2C are signal diagrams of the judging device when a positive and negative standard voltage is applied, respectively.

The judging device 37 is adapted to switch on its output if the output V from the mixer 36 increases or decreases, and this output from the judging device 37 serves as the detection output (or the signal indicative of the presence or absence of an approaching target object) of the detector 30. This judging device 37 may be of a very simple circuit structure as shown in FIG. 2A, basic in electronics adapted to apply a standard voltage C to one of the input terminals of a comparator and an input signal A (corresponding to the output V) to the other input terminal through a high pass filter (HPF) (as filtered signal B). The output from this comparator serves as the output signal D corresponding to the aforementioned detection output.

Figure 2B:
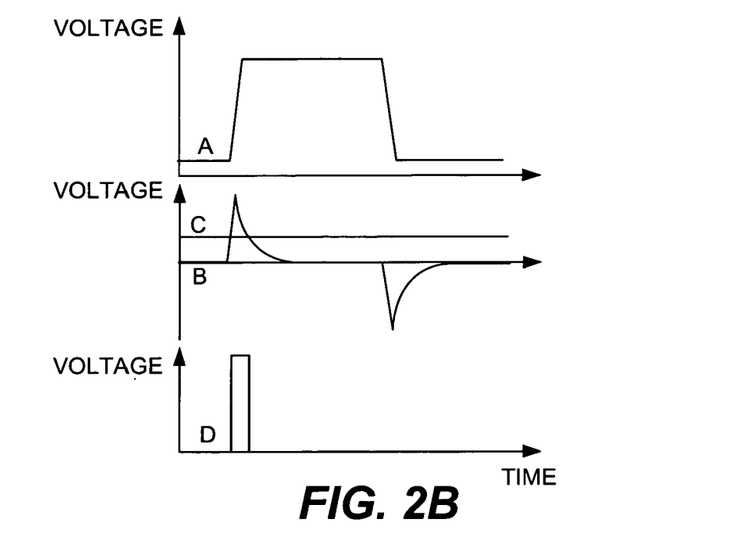

In the above, if the standard voltage C is positive, the output signal D is switched on when the input signal A is increasing, as shown in FIG. 2B. If the standard voltage C is negatively set, the output signal D is switched on when the input signal A is decreasing.

Figure 1C:
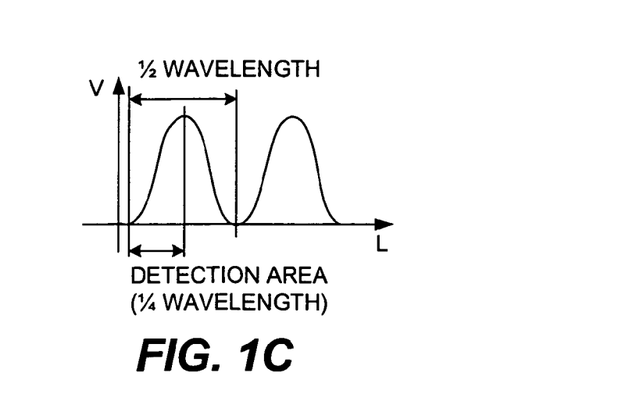
FIG. 1C is a graph showing a relationship between the distance to the target object of detection and the detection output.
Figure 2C:
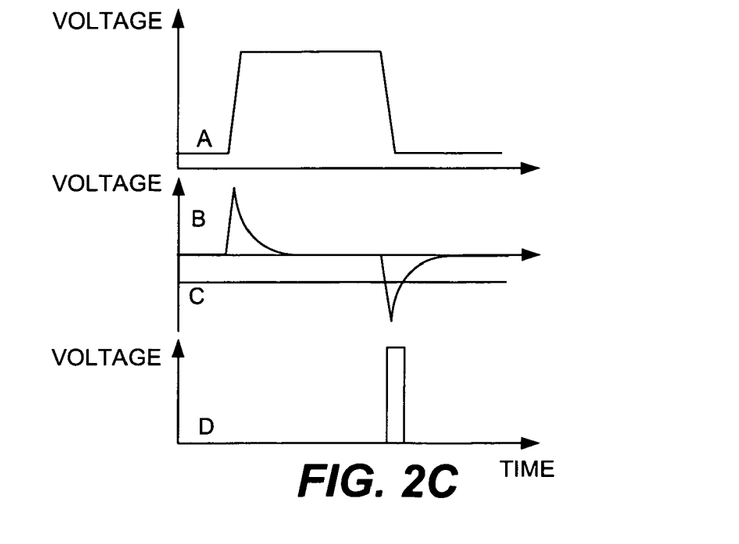

If the relationship between the distance L to the target object of detection and the output V is set such that V will increase as L increases (as shown, for example, in FIG. 1C), the output V decreases as the target object approaches. Thus, if it is so set, a circuit which functions as shown in FIG. 2C (switching on the output when the output V decreases) is used for the judging device 37.

Next, methods of setting a detection distance and the frequency of the transmission wave for the detector 30 are explained.

The detection distance for the detector 30 is set so as to be equal to or less than ¼ of the wavelength of the effective frequency. If it is desired to set the detection distance at 3 cm–10 cm, for example, a frequency value (such as 1 GHz) is set such that one quarter of the corresponding wavelength will be 7 cm or over. The space within 3 cm from the antennas 32 and 33 of the detector 30 will be filled with a material transmitting electromagnetic waves but preventing the hand from penetrating such that the detection area is appropriately reduced. The transmission output and the reception sensitivity may be adjusted (for example, through the specifications of the oscillator device 34 and the antennas 32 and 33) such that the intensity of the reception wave is too weak in the area away from the antennas 32 and 33 by 10 cm or more and the target object at such distances cannot be detected.

The delay devices 38 and 39 are designed such that the phase difference between the signal path PA (from the branching device 35 through the delay device 38, the transmission antenna 32, air space, the hand as the target object, air space again and the reception antenna 33 to the mixer 36) and the signal path PB (from the branching device 35 through the delay device 39 to the mixer 36) is such that the entire detection area will be within the range from −¼ wavelength through 0 (same phase) to +¼ wavelength or from +¼ wavelength through the opposite-phase relationship to −¼ wavelength. If the phase difference is thus set, a characteristic as shown in FIG. 1C (that is, the characteristic of the output V changing in one direction with respect to the distance L within the detection area) can be obtained. It should be remembered that the detection cannot be judged properly if the detection spans both of these ranges.

With the detector 30 thus structured, the output V does not fail to increase or decrease to switch on the detection output of the judging device 37 if a person's hand approaches the detection area from outside or moves in the approaching direction inside the detection area. Thus, the approach of the person's hand can be detected by electromagnetic waves in a non-contact manner over a sufficiently large detection area.

Under the same principle, the detector 30 can also detect the motion of the person's hand in the opposite (retreating) direction either within the detection area or outward from the detection area. If both a judging device for detecting an approaching object and another device for detection a retreating object are provided, objects of both kinds can be detected.

Next, the functions of the control circuit 21 and the operations of the system of this invention are explained in basic terms. If the detection output from the detector 30 is switched on while the door of the vehicle is in the locked condition (or while the door lock actuator 1 is activated), the aforementioned startup signal is outputted from the transmission circuit 22 and the transmission antenna 23 for a specified number of times and the reception circuit 24 is also activated to receive wave signals. If an answer signal is received from the portable unit 10 after the startup signals are transmitted, it is checked to determine whether or not the ID code contained in the answer signal corresponds to the ID code preliminarily registered in the memory. If the codes match, the door lock actuator 1 is controlled such that the locked door of the vehicle is unlocked.

Figure 3:
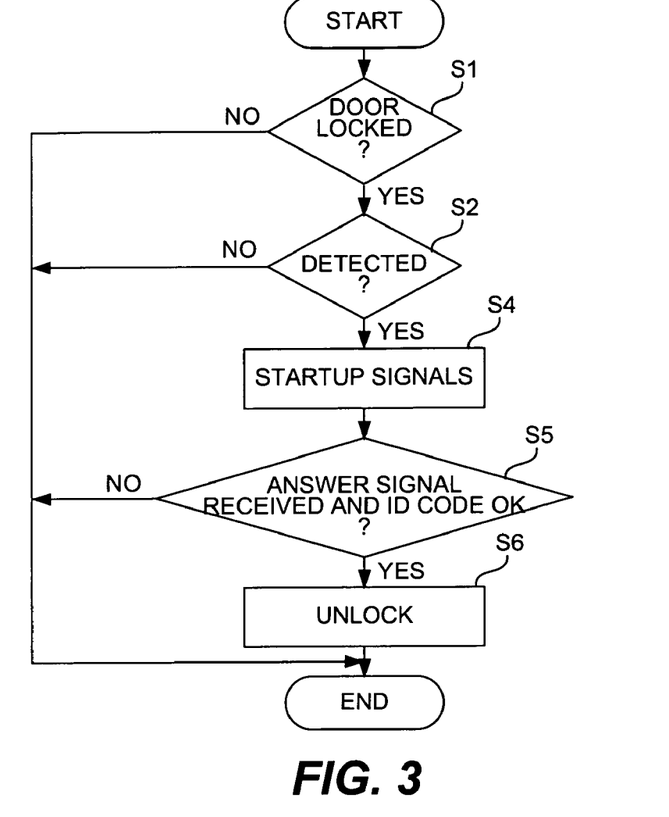
FIG. 3 is a flowchart for the control of the lock controller.

FIG. 3 shows an example of flowchart for the control process explained above. The control circuit 21 may be adapted to repeat the operations of FIG. 3 in a periodic manner.

In Step S1, it is determined whether the door is in the locked condition or not. If the door is not locked (NO in Step S1), the sequence of the processes is terminated. If the door is locked (YES in Step S1), it is determined whether or not a person's hand has been detected, that is, whether or not the detection output of the detector 30 is switched on (Step S2). If the detection is being made (YES in Step S2), the startup signal is transmitted for a specified number of times (Step S4). Next, it is determined whether or not an answer signal has been received and the ID code contained in the received answer signal has been found to correctly match (Step S5). If the ID code is found to be correct (Yes in Step S5), the door is locked by controlling the door lock actuator 1 (Step S6). If it is determined that the hand is not being detected in Step 2 or if the ID code is found not to be correct in Step S5, the sequence of the processes is terminated.

Favorable characteristics of the detector 30 as described above as well as a lock controller using such a detector are described next.

(1) Since the user's hand approaching the door is detected electromagnetically in a non-contact way by using the Doppler radar technology, errors in detection due to dirt or the like do not occur and even the possibility of a detection error due to unwanted objects such as rain drops and dead leaves is lower than by a conventional optical sensor.

(2) Since the detection area can be made sufficiently large (or the detection distance sufficiently long), an appropriate response characteristic can be easily obtained. Since the user's hand can be detected at a position sufficiently before it contacts the door handle, the door which was in the locked condition when the user was merely beginning to pull the door in order to open it can be automatically unlocked in a reliable manner, unless the user moves the hand at an exceptionally fast speed, such that the convenience of a passive entry system is sufficiently utilized.

(3) It is not necessary to set all of the components of the detector 30 (such as the sensor circuit 31) at a specified position (such as the position of the door handle) where the object to be detected is approaching. It is only the antennas 32 and 33 that are required to be located at or near the specified position. Since the detection is judged on the basis of changes in the received output and the microcomputer is not used for the judgment, the structure of the sensor circuit 31 is particularly simplified and compact such that the detector 30 inclusive of its sensor circuit 31 can be installed inside the door handle relatively easily. Thus, the shape and the size of the door handle need not be modified and the freedom in its design is not significantly affected.

(4) As explained above, the microcomputer need not be used for the judgment. Thus, the power consumption is significantly less than by a prior art Doppler radar which carries out operations by using a microcomputer for a complicated judgment analysis, and the detector can be mounted easily to a vehicle for the generation of a trigger for a passive entry system because there is no problem of using up the battery cells.

Figure 4A:
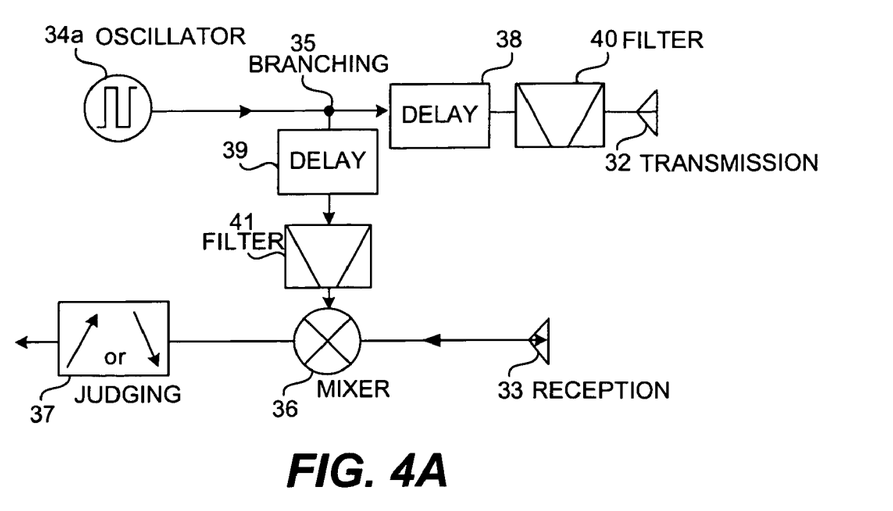
FIGS. 4A, 4B and 4C are block diagrams of other detectors embodying this invention.
Figure 4B:
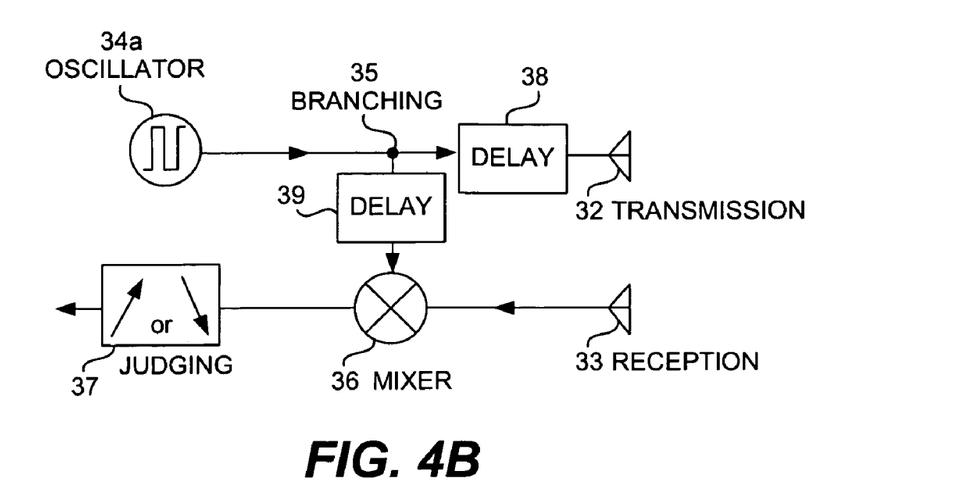
Figure 4C:
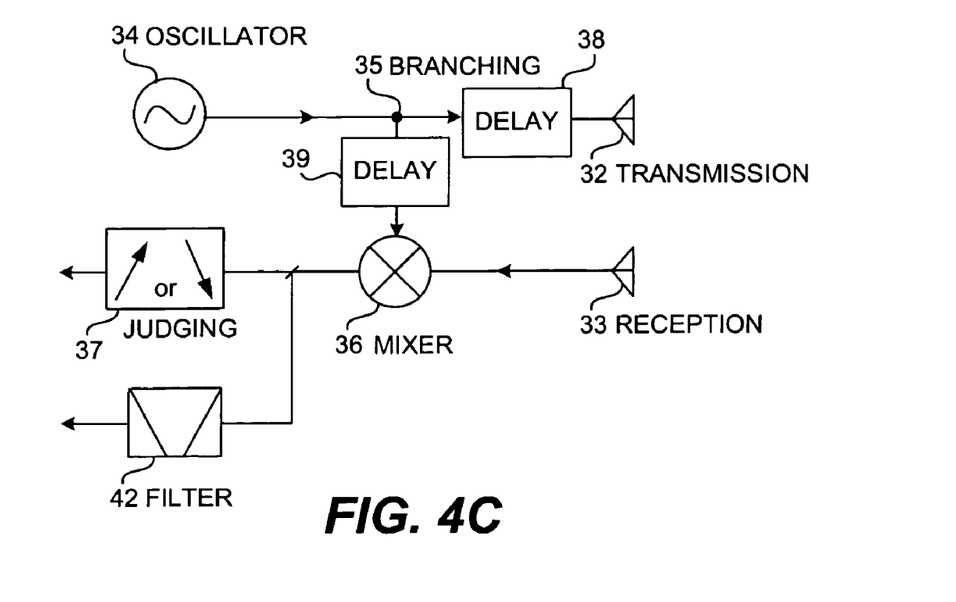

FIGS. 4A, 4B and 4C shows detectors according to other embodiments of the invention. In these figures, like components are indicated by the same symbols as used in FIG. 1 and are not described in a repetitious manner for the convenience of disclosure.

FIG. 4A shows a sensor circuit according to a second embodiment of the invention characterized as comprising an oscillator device 34a adapted to generate a non-sinusoidal wave with frequency less than ⅕ and preferably less than ⅒ of the effective frequency as the base wave to serve as the base of the transmission wave. Filtering devices (the "filters") 40 and 41 are also provided respectively on the output side of the delay devices 38 and 39.

Figure 5A:
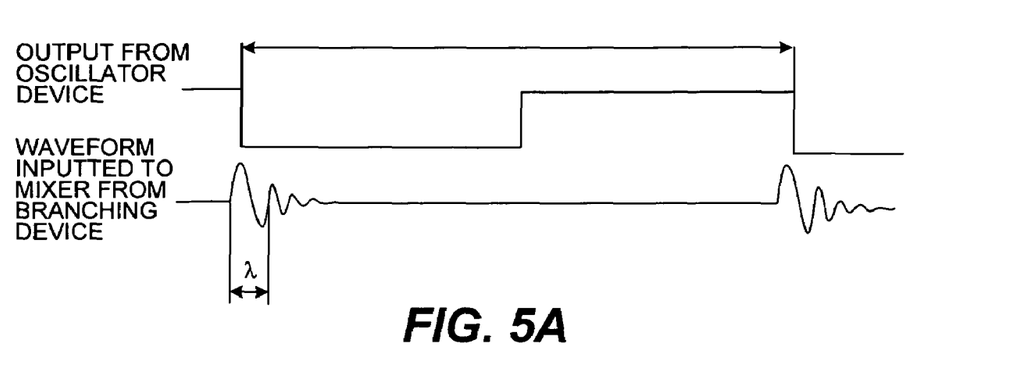
FIGS. 5A, 5B and 5C are diagrams for explaining the transmission and reception waves.

The aforementioned non-sinusoidal wave may be a rectangular impulse wave, say, of frequency 1 MHz for generating a signal including effective frequency such as 1 GHz (harmonics, to be explained below) and the filtering devices 40 and 41 are for the purpose of limiting the unnecessary frequency components other than the effective frequency. In this case, harmonics due to the ringing at the fall time of the rectangular wave (base wave) generated by the oscillation device 34a, as shown in FIG. 5A, is transmitted from the transmitted from the transmission antenna 32 through the filtering device 40 as the transmission wave with the effective frequency ("effective wave") and inputted through the filtering device 41 into the mixer 36. Symbol $\lambda$ in FIG. 5A indicates the wavelength of the aforementioned harmonics (effective wave). Symbol t in FIG. 5A indicates the period of repetition of the aforementioned rectangular wave.

Figure 5B:
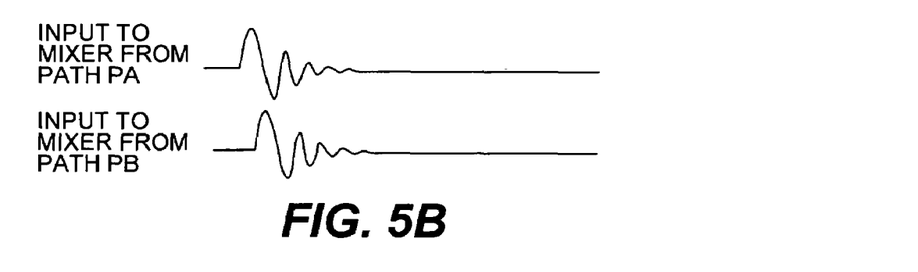
Figure 5C:
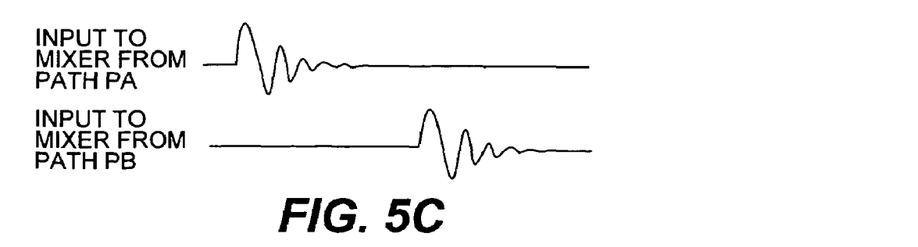

In this example, the signal path difference between the aforementioned signal paths PA and PB is arranged to be less than a few wavelengths (for example, within $\pm 2$–$3\lambda$, and preferably within $\pm 1\lambda$) of the aforementioned harmonics (the effective wave) in view of the desired size of the detection area. In other words, the output from the filtering device 41 and the output from the reception antenna 33 must match in timing within this extent. Since the waveform of the output from the reception antenna 33 repeats with a period of t, however, the aforementioned signal path difference may include a path difference of corresponding to an integral multiple of this period t. If the signal path difference satisfies this condition, the inputs to the mixer 36 through the paths PA and PB overlap on the time axis as shown in FIG. 5B and the mixer 36 makes an effective mixing. If the signal path difference does not satisfy the condition described above, the signals arriving at the mixer 36 through the signal paths PA and PB are not sufficiently synchronized, as shown in FIG. 5C and the mixer 36 fails to mix signals effectively for the purpose of the detection.

This embodiment has all the advantages of the detector according to the first embodiment. It is further advantageous in that the oscillator device 34a can be formed with a less expensive circuit and that the characteristics of the antennas 32 and 33 do not have to be adjusted to any particular frequency such that there is a greater freedom in their design.

FIG. 4B shows a sensor circuit according to a third embodiment of the invention which may be considered a variation of the second embodiment, characterized wherein the circuits of the delay devices 38 and 39 and the frequency characteristics of the antennas 32 and 33 are designed such that frequency components other than the effective frequency are controlled. Normally, circuits and antennas have their own frequency characteristics. According to this embodiment, these frequency characteristics are specified such that the filtering devices 40 and 41 of the second embodiment shown in FIG. 4A are dispensed with. This embodiment is advantageous, therefore, in that the circuit structure is accordingly simpler.

FIG. 4C shows a sensor circuit according to a fourth embodiment of the invention characterized as having the output from the mixer divided into two ways and having another filtering device 42 provided to one of the output sides of the mixer 36 for outputting data of another kind to be explained below, the other output of the mixer 36 being inputted to the judging device 37.

This filtering device 42 may be a high pass filter for allowing only high-frequency components to pass, a low pass filter for allowing only low-frequency components to pass, or a band pass filter for allowing only components within a specified frequency range to pass. The speed (frequency) at which the output V from the mixer 36 goes up or down changes, depending on the speed of the target object of detection. Thus, the output V from the mixer 36 can be outputted through this filter 42 if the speed of the target object is within a certain range determined by the frequency characteristics of the filtering device 42 but the output V fails to be outputted from the filtering device 42 if the speed of the target object is not within this specific range.

In summary, this filtering device 42 functions as an output device for a speed signal corresponding to the speed of the target object, and some unique advantages can be enjoyed by using the outputs from such a filtering device. Firstly, such a filtering device is useful because it becomes possible to transmit to the control unit 21 not only information related to the approach of the target object (such as the output signal from the judging device 37) but also information on its speed. If a speed exceeding the range of normal hand motion is detected, for example, the result of detection can be forcibly changed into non-detection even if the judging device 37 would be concluding that the detection output should be switched on. In other words, the control unit 21 may function such that the automatic unlocking of the door will not be effected. In this manner, erroneous detection of objects other than a person's hand such as fast-moving objects and stationary objects can be avoided. An alarm may be incorporated such that the user can be warned if an attempt is made to open the door with a hand motion too quick such that the automatic unlocking of the door could not be effected in time and the door fails to open.

Although FIG. 5C shows an arrangement wherein the filtering device 42 and the judging device 37 are connected in parallel, a similar filtering device may be connected in series with the judging device 37 (that is, on the output side of the mixer 36 and on the input side of the judging device 37). Such a filtering device functions as a speed correcting means for changing the detection output from the judging device 37 on the basis of the speed change outputted from the mixer 36. If this change of speed is too fast or too slow and hence if the speed of motion of the target object is too fast or too slow, the detection output may be forcibly made not to be switched on. Thus, erroneous detection of objects other than a person's hand such as fast-moving objects and stationary objects can be avoided even more reliably with such a filtering device.

Although the invention has been described by way of only a limited number of examples, these examples are not intended to limit the scope of the invention. Many modifications and variations are possible within the scope of the invention. Indeed, the invention is not limited to the unlocking of a door but may be applied to many other kinds of objects of control and contents of control. For example, a detector according to this invention may be used to generate a trigger for an automatic locking operation of a passive entry system. It may also be used for the automatic locking and unlocking of the trunk of an automobile, a door of other kinds of vehicles such as a boat and a small plane or a door of a building such as a residential house or an office building. The detector of this invention need not be used for the detection of a person's hand. It may be used for the detection of other kinds of objects as long as the object can reflect electromagnetic waves effectively.

The aforementioned request signal within the context of this invention may include not only a startup signal for starting up the portable unit in a SLEEP mode (the microcomputer being in the WAIT mode) but also a signal for asking the portable unit already started up (whether or not the microcomputer is still in the WAIT mode) to transmit a specified answer signal. Such a request signal is not required to be sent on the LF band but may be sent on other bands such as the UHF band, although the use of the LF band is advantageous because power transmission can be effected relatively efficiently.

The request signal may contain its own characterization code (preferably different from the aforementioned ID code for security reasons) because there may be many vehicles having entry systems of the same kinds parked in the neighborhood. In such a situation, the portable unit will be receiving request signals transmitted from all these vehicles and it is therefore necessary to arrange it such that the portable unit will not be required to transmit an answer signal each time such a request signal is received and will transmit the answer signal only after checking the characterization code of each received request signal.

The antennas on the main device and those on the detector may be integrated into one common antenna if there is no problem, say, with the different frequency bands to be used.

In summary, the present invention provides a detector which is superior in reliability, response characteristics, operability by the user and suitability to a vehicle (say, in terms of size, design limitations and power consumption rate), as well as a lock controller (or a controller for a passive entry system) of a superior quality.

What is claimed is:

1. A detector for detecting a target object approaching and retreating, said detector comprising:
   an oscillator device for generating a transmission wave:
   a branching device for branching said transmission wave generated by said oscillator device;
   a transmission device for transmitting said transmission wave into space as electromagnetic waves;
   a reception device for receiving the transmission wave transmitted by said transmission device and reflected by said target object;
   a mixer for mixing a reception signal received by said reception device and a branched signal branched by said branching device to output a mixed signal; and
   a judging device for switching on a detection output indicating said object approaching and retreating based on an increase and a decrease of said mixed signal outputted from said mixer;
   wherein a detection distance is set within ¼ wavelength of frequency effective for the detection and wherein said oscillator device generates a non-sinusoidal wave with frequency less than ⅕ of frequency effective for the detection.

2. The detector of claim 1 further comprising a speed correcting device for changing said detection output based on the speed of change of said mixed signal outputted from said mixer.

3. A lock controller comprising a detector according to claim 2 and a main apparatus which is provided to a structure with a lockable part having a handle and being adapted to open and close, wherein said main apparatus is adapted to send by wireless transmission a specified request signal to a portable device carried by said user, to receive an answer signal from said portable device in response to said request signal, and to cause said lockable part, if locked, to be unlocked after ascertaining that said received answer signal is a correct signal.

4. The detector of claim 1 further comprising a speed signal outputting device for outputting a speed signal indicative of a speed of said target object based on the speed of change of said mixed signal outputted from said mixer.

5. A lock controller comprising a detector according to claim 4 and a main apparatus which is provided to a structure with a lockable part having a handle and being adapted to open and close, wherein said main apparatus is adapted to send by wireless transmission a specified request signal to a portable device carried by said user, to receive an answer signal from said portable device in response to said request signal, and to cause said lockable part, if locked, to be unlocked after ascertaining that said received answer signal is a correct signal.

6. A detector for detecting a target object approaching and retreating, said detector comprising:
   an oscillator device for generating a transmission wave;
   a branching device for branching said transmission wave generated by said oscillator device;
   a transmission device for transmitting said transmission wave into space as electromagnetic waves;
   a reception device for receiving the transmission wave transmitted by said transmission device and reflected by said target object;
   a mixer for mixing a reception signal received by said reception device and a branched signal branched by said branching device to output a mixed signal;
   a judging device for switching on a detection output indicating said object approaching and retreating based on an increase and a decrease of said mixed signal outputted from said mixer; and
   a speed signal outputting device for outputting a speed signal indicative of a speed of said target object based on the speed of change of said mixed signal outputted from said mixer;
   wherein a detection distance is set within $\frac{1}{4}$ wavelength of frequency effective for the detection.

7. A lock controller comprising a detector according to claim 6 and a main apparatus which is provided to a structure with a lockable part having a handle and being adapted to open and close, wherein said main apparatus is adapted to send by wireless transmission a specified request signal to a portable device carried by said user, to receive an answer signal from said portable device in response to said request signal, and to cause said lockable part, if locked, to be unlocked after ascertaining that said received answer signal is a correct signal.

* * * * *